United States Patent
Ogirko et al.

(10) Patent No.: US 10,429,998 B2
(45) Date of Patent: Oct. 1, 2019

(54) GENERATING A BASELINE COMPENSATION SIGNAL BASED ON A CAPACITIVE CIRCUIT

(71) Applicant: Cypress Semiconductor Corporation, San Jose, CA (US)

(72) Inventors: Roman Ogirko, Lviv (UA); Denis Ellis, County Cork (IE); Kaveh Hosseini, Cork (IE); Brendan Lawton, Cork (IE)

(73) Assignee: Cypress Semiconductor Corporation, San Jose, CA (US)

( * ) Notice: Subject to any disclaimer, the term of this patent is extended or adjusted under 35 U.S.C. 154(b) by 91 days.

(21) Appl. No.: 14/752,687

(22) Filed: Jun. 26, 2015

(65) Prior Publication Data

US 2016/0026295 A1 Jan. 28, 2016

Related U.S. Application Data

(63) Continuation-in-part of application No. 14/670,345, filed on Mar. 26, 2015, now Pat. No. 9,746,974.

(60) Provisional application No. 62/040,120, filed on Aug. 21, 2014, provisional application No. 62/028,230, filed on Jul. 23, 2014, provisional application No. 62/028,207, filed on Jul. 23, 2014.

(51) Int. Cl.
*G06F 3/041* (2006.01)
*G06F 3/044* (2006.01)

(52) U.S. Cl.
CPC ............ *G06F 3/044* (2013.01); *G06F 3/0416* (2013.01); *G06F 2203/04101* (2013.01)

(58) Field of Classification Search
CPC ......... G06F 2203/04101; G06F 3/0416; G06F 3/044
See application file for complete search history.

(56) References Cited

U.S. PATENT DOCUMENTS

| | | | | |
|---|---|---|---|---|
| 7,019,551 B1 * | 3/2006 | Biesterfeldt | ......... | H03K 17/163 326/27 |
| 7,277,817 B2 | 10/2007 | Hall et al. | | |
| 7,663,611 B2 * | 2/2010 | Fagard | .................. | G06F 3/0412 345/174 |
| 7,843,249 B2 * | 11/2010 | Zhang | .................. | H03K 17/962 324/658 |
| 8,026,904 B2 * | 9/2011 | Westerman | ............. | G06F 3/044 178/18.01 |
| 8,054,296 B2 * | 11/2011 | Land | ..................... | G06F 3/0418 178/18.01 |

(Continued)

OTHER PUBLICATIONS

International Search Report for International Application No. PCT/US2015/037615 dated Sep. 16, 2015; 2 pages.

(Continued)

*Primary Examiner* — Michael J Jansen, II

(57) ABSTRACT

A capacitance-sensing circuit may include a plurality of channel inputs associated with measuring a capacitance of a unit cell of a capacitive sense array. The capacitance-sensing circuit may also include a baseliner component that is coupled to the plurality of channel inputs. The baseliner component may generate a baseline compensation signal using a capacitive circuit and may provide the baseline compensation signal to each of the plurality of channel inputs of the capacitive sense array.

16 Claims, 12 Drawing Sheets

(56) References Cited

U.S. PATENT DOCUMENTS

| | | | | |
|---|---|---|---|---|
| 8,058,937 B2* | 11/2011 | Qin | G06F 3/03547 | 178/18.06 |
| 8,068,097 B2* | 11/2011 | GuangHai | G06F 3/0227 | 345/168 |
| 8,089,383 B2* | 1/2012 | Williams | H03M 1/005 | 341/136 |
| 8,093,914 B2* | 1/2012 | Maharyta | G01R 27/2605 | 324/684 |
| 8,111,243 B2* | 2/2012 | Peng | G06F 3/044 | 345/173 |
| 8,120,584 B2* | 2/2012 | Grivna | G06F 3/016 | 345/169 |
| 8,144,125 B2* | 3/2012 | Peng | G06F 3/044 | 178/18.01 |
| 8,144,126 B2* | 3/2012 | Wright | G06F 1/3203 | 178/18.03 |
| 8,154,310 B1* | 4/2012 | Maharyta | G06F 3/0416 | 324/678 |
| 8,248,081 B2* | 8/2012 | Maharyta | G06F 3/03547 | 324/601 |
| 8,258,797 B2* | 9/2012 | Shahparnia | G01D 3/08 | 324/659 |
| 8,446,158 B1 | 5/2013 | Jansson | | |
| 8,487,639 B1* | 7/2013 | Walsh | G06F 3/044 | 324/658 |
| 8,493,356 B2* | 7/2013 | Joharapurkar | G06F 3/0418 | 345/174 |
| 8,537,119 B1* | 9/2013 | Grivna | G06F 3/016 | 345/169 |
| 8,570,053 B1* | 10/2013 | Ryshtun | H03K 17/962 | 324/678 |
| 8,599,167 B2* | 12/2013 | Joharapurkar | G06F 3/0418 | 178/18.01 |
| 8,610,443 B1* | 12/2013 | Ryshtun | G06F 3/03545 | 324/658 |
| 8,614,693 B2 | 12/2013 | King et al. | | |
| 8,711,120 B2 | 4/2014 | Hargreaves et al. | | |
| 8,717,302 B1* | 5/2014 | Qin | G06F 3/044 | 178/18.06 |
| 8,729,913 B2* | 5/2014 | Maharyta | G06F 3/044 | 324/658 |
| 8,766,939 B2* | 7/2014 | Sobel | G06F 3/0416 | 178/18.06 |
| 8,786,295 B2* | 7/2014 | Chandra | G06F 3/044 | 324/686 |
| 8,803,813 B2* | 8/2014 | XiaoPing | G06F 1/32 | 178/18.01 |
| 8,816,984 B2 | 8/2014 | Hotelling et al. | | |
| 8,860,432 B2* | 10/2014 | Shen | G06F 3/044 | 324/613 |
| 8,866,494 B2 | 10/2014 | Ryshtun et al. | | |
| 8,866,500 B2* | 10/2014 | Kremin | G01R 27/2605 | 324/658 |
| 8,902,172 B2* | 12/2014 | Peng | G06F 3/0416 | 345/173 |
| 8,947,373 B2 | 2/2015 | Kremin et al. | | |
| 9,069,405 B2* | 6/2015 | Grivna | G06F 3/0416 | |
| 9,154,160 B2 | 10/2015 | Kremin | | |
| 9,268,441 B2* | 2/2016 | Walsh | G06F 3/0416 | |
| 9,377,907 B2 | 6/2016 | Shahparnia | | |
| 9,430,105 B2 | 8/2016 | Yao et al. | | |
| 9,547,394 B2* | 1/2017 | Hotelling | G06F 3/044 | |
| 9,658,722 B2 | 5/2017 | Schwartz | | |
| 9,746,974 B2* | 8/2017 | Ellis | G06F 3/0416 | |
| 9,766,749 B2* | 9/2017 | Pan | G06F 3/0418 | |
| 9,857,921 B2* | 1/2018 | Pant | G06F 3/044 | |
| 9,965,108 B2* | 5/2018 | Li | G06F 3/0416 | |
| 10,061,444 B2* | 8/2018 | Shahparnia | G06F 3/044 | |
| 10,068,121 B2* | 9/2018 | Kremin | G06F 3/044 | |
| 10,147,382 B2* | 12/2018 | Nakanishi | G06F 3/044 | |
| 2005/0109125 A1 | 5/2005 | Hall et al. | | |
| 2006/0125717 A1* | 6/2006 | Fagard | G06F 3/0412 | 345/55 |
| 2006/0138574 A1* | 6/2006 | Saito | G01L 1/146 | 257/417 |
| 2007/0229466 A1* | 10/2007 | Peng | G06F 3/044 | 345/173 |
| 2007/0229468 A1* | 10/2007 | Peng | G06F 3/044 | 345/173 |
| 2007/0262962 A1* | 11/2007 | XiaoPing | G06F 1/32 | 345/173 |
| 2007/0262963 A1* | 11/2007 | Xiao-Ping | G06F 3/03547 | 345/173 |
| 2007/0296709 A1* | 12/2007 | GuangHai | G06F 3/0227 | 345/173 |
| 2008/0036473 A1* | 2/2008 | Jansson | G06F 3/03547 | 324/678 |
| 2008/0047764 A1* | 2/2008 | Lee | G08C 21/00 | 178/18.06 |
| 2008/0088594 A1* | 4/2008 | Liu | G06F 3/044 | 345/173 |
| 2008/0136792 A1* | 6/2008 | Peng | G06F 3/0416 | 345/174 |
| 2008/0150905 A1* | 6/2008 | Grivna | G06F 3/016 | 345/173 |
| 2008/0158174 A1* | 7/2008 | Land | G06F 3/0418 | 345/173 |
| 2008/0158182 A1* | 7/2008 | Westerman | G06F 3/0416 | 345/173 |
| 2008/0179112 A1* | 7/2008 | Qin | G06F 3/03547 | 178/18.06 |
| 2008/0196945 A1* | 8/2008 | Konstas | G06F 3/03547 | 178/18.03 |
| 2008/0277171 A1* | 11/2008 | Wright | G06F 1/3203 | 178/18.06 |
| 2009/0008161 A1* | 1/2009 | Jones | G06F 3/044 | 178/18.06 |
| 2009/0066674 A1* | 3/2009 | Maharyta | G06F 3/03547 | 345/178 |
| 2009/0108914 A1* | 4/2009 | Zhang | H03K 17/962 | 327/517 |
| 2009/0153152 A1* | 6/2009 | Maharyta | G01R 27/2605 | 324/684 |
| 2009/0315850 A1* | 12/2009 | Hotelling | G06F 3/044 | 345/173 |
| 2009/0315851 A1* | 12/2009 | Hotelling | G06F 3/044 | 345/173 |
| 2010/0031205 A1* | 2/2010 | Chang | G06F 17/5063 | 716/100 |
| 2010/0283647 A1* | 11/2010 | Williams | H03M 1/005 | 341/135 |
| 2010/0327882 A1* | 12/2010 | Shahparnia | G01D 3/08 | 324/659 |
| 2011/0025629 A1* | 2/2011 | Grivna | G06F 3/0416 | 345/173 |
| 2011/0115729 A1 | 5/2011 | Kremin et al. | | |
| 2011/0261005 A1* | 10/2011 | Joharapurkar | G06F 3/0418 | 345/174 |
| 2011/0261007 A1* | 10/2011 | Joharapurkar | G06F 3/0418 | 345/174 |
| 2012/0043970 A1* | 2/2012 | Olson | G01R 27/2605 | 324/601 |
| 2012/0043973 A1 | 2/2012 | Kremin | | |
| 2012/0049868 A1* | 3/2012 | Maharyta | G06F 3/044 | 324/679 |
| 2012/0050210 A1 | 3/2012 | King et al. | | |
| 2012/0217978 A1* | 8/2012 | Shen | G06F 3/0418 | 324/601 |
| 2012/0256868 A1 | 10/2012 | Choi et al. | | |
| 2012/0256869 A1* | 10/2012 | Walsh | G06F 3/0416 | 345/174 |
| 2012/0268145 A1* | 10/2012 | Chandra | G06F 3/044 | 324/686 |
| 2012/0286800 A1* | 11/2012 | Maharyta | G06F 3/0416 | 324/603 |
| 2012/0287077 A1* | 11/2012 | Pant | G06F 3/044 | 345/174 |
| 2012/0293447 A1* | 11/2012 | Heng | G06F 3/044 | 345/174 |

(56) References Cited

U.S. PATENT DOCUMENTS

| | | | |
|---|---|---|---|
| 2012/0319996 | A1 | 12/2012 | Hotelling et al. |
| 2013/0176269 | A1* | 7/2013 | Sobel ............... G06F 3/044 345/174 |
| 2013/0314109 | A1* | 11/2013 | Kremin ............ G01R 27/2605 324/686 |
| 2014/0015746 | A1 | 1/2014 | Hargreaves et al. |
| 2014/0085246 | A1 | 3/2014 | Shahparnia |
| 2014/0267151 | A1 | 9/2014 | Ryshtun et al. |
| 2014/0375600 | A1* | 12/2014 | Pan ..................... G06F 3/044 345/174 |
| 2015/0035787 | A1 | 2/2015 | Shahparnia et al. |
| 2015/0084876 | A1 | 3/2015 | Schwartz |
| 2015/0227232 | A1 | 8/2015 | Yao et al. |
| 2015/0235607 | A1 | 8/2015 | Nakanishi et al. |
| 2015/0331535 | A1* | 11/2015 | Li ....................... G06F 3/044 348/174 |
| 2016/0026295 | A1* | 1/2016 | Ogirko ............... G06F 3/0416 345/174 |
| 2016/0054829 | A1* | 2/2016 | Ellis .................. G06F 3/0416 345/178 |
| 2016/0117017 | A1 | 4/2016 | Kremin et al. |
| 2016/0357288 | A1 | 12/2016 | Chao et al. |
| 2017/0061188 | A1* | 3/2017 | Kremin ............... G06F 3/044 |
| 2017/0371444 | A9 | 12/2017 | Chao et al. |

OTHER PUBLICATIONS

USPTO Non-Final Rejection for U.S. Appl. No. 14/670,345 dated Jun. 15, 2015, 14 pages.
Written Opinion of the International Searching Authority for International Application No. PCT/US2015/037615 dated Sep. 16, 2015; 6 pages.
USPTO Advisory Action for U.S. Appl. No. 14/670,345 dated Dec. 23, 2015; 3 pages.
USPTO Examiner Initiated Interview Summary for U.S. Appl. No. 14/670,345 dated Mar. 10, 2017, 1 page.
USPTO Final Rejection for U.S. Appl. No. 14/670,345 dated Oct. 21, 2015; 18 pages.
USPTO Non-Final Rejection for U.S. Appl. No. 14/670,345 dated Oct. 3, 2016, 25 pages.
USPTO Notice of Allowance for U.S. Appl. No. 14/670,345 dated Mar. 10, 2017, 13 pages.
USPTO Notice of Allowance for U.S. Appl. No. 14/670,345 dated Mar. 29, 2017, 10 pages.
USPTO Notice of Allowance for U.S. Appl. No. 14/670,345 dated Jun. 30, 2017, 16 pages.
USPTO Applicant Initiated Interview Summary for U.S. Appl. No. 14/670,345 dated Aug. 7, 2015; 1 page.
USPTO Examiner Initiated Interview Summary for U.S. Appl. No. 14/670,345 dated Mar. 29, 2017; 1 page.
USPTO Non-Final Rejection for U.S. Appl. No. 15/659,798 dated Oct. 10, 2017; 24 pages.
USPTO Non-Final Rejection for U.S. Appl. No. 15/659,798 dated Apr. 3, 2018; 26 pages.
USPTO Final Rejection for U.S. Appl. No. 15/659,798 dated Oct. 10, 2018; 25 pages.
USPTO Advisory Action for U.S. Appl. No. 15/659,798 dated Dec. 20, 2018; 3 pages.
USPTO Non Final Rejection for U.S. Appl. No. 15/659,798 dated May 1, 2019; 28 pages.
USPTO Final Rejection for U.S. Appl. No. 15/659,798 dated Aug. 16, 2019; 30 pages.

* cited by examiner

GENERATING A BASELINE COMPENSATION SIGNAL BASED ON A CAPACITIVE CIRCUIT

RELATED APPLICATIONS

This application is a continuation-in-part of application Ser. No. 14/670,345 filed on Mar. 26, 2015 which claims the benefit of U.S. Provisional Application No. 62/040,120, filed Aug. 21, 2014, and this application further claims the benefit of U.S. Provisional Application No. 62/028,230 filed Jul. 23, 2014 and U.S. Provisional Application No. 62/028,207 filed Jul. 23, 2014, the entire contents of which are hereby incorporated by reference herein in their entirety.

TECHNICAL FIELD

The present disclosure generally relates to sensing systems, and more particularly to generating a baseline compensation signal based on a capacitive circuit.

BACKGROUND

Capacitance sensing systems can sense electrical signals generated on electrodes that reflect changes in capacitance. Such changes in capacitance can indicate a touch event (e.g., the proximity of an object to particular electrodes). Capacitive sense elements may be used to replace mechanical buttons, knobs and other similar mechanical user interface controls. The use of a capacitive sense element allows for the elimination of complicated mechanical switches and buttons, providing reliable operation under harsh conditions. In addition, capacitive sense elements are widely used in modern customer applications, providing user interface options in existing products. Capacitive sense elements can range from a single button to a large number arranged in the form of a capacitive sense array for a touch-sensing surface.

Transparent touch screens that utilize capacitive sense arrays are ubiquitous in today's industrial and consumer markets. They can be found on cellular phones, GPS devices, set-top boxes, cameras, computer screens, MP3 players, digital tablets, and other such devices. The capacitive sense arrays work by measuring the capacitance of a capacitive sense element, and looking for a delta in capacitance indicating a touch or presence of a conductive object. When a conductive object (e.g., a finger, hand, or other object) comes into contact or close proximity with a capacitive sense element, the capacitance changes and the conductive object is detected. The capacitance changes of the capacitive touch sense elements can be measured by an electrical circuit. The electrical circuit converts the measured capacitances of the capacitive sense elements into digital values.

There are two typical types of capacitance: 1) mutual capacitance where the capacitance-sensing circuit has access to both electrodes of the capacitor; 2) self-capacitance where the capacitance-sensing circuit has only access to one electrode of the capacitor where the second electrode is tied to a DC voltage level or is parasitically coupled to Earth Ground.

BRIEF DESCRIPTION OF THE DRAWINGS

The present disclosure is illustrated by way of example, and not of limitation, in the figures of the accompanying drawings.

DETAILED DESCRIPTION

Figure 1:
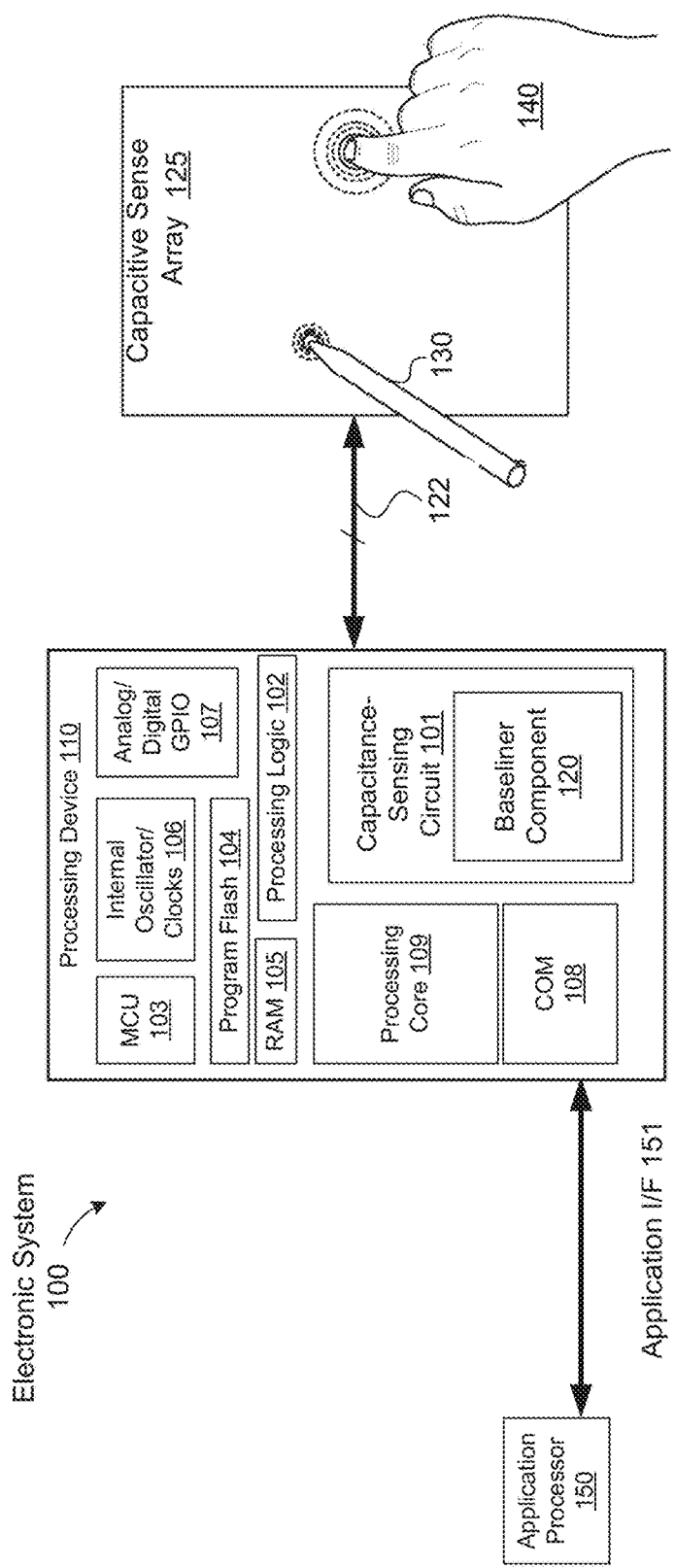
FIG. 1 is a block diagram illustrating an electronic system having a processing device that includes a baseliner component in accordance with some embodiments of the present disclosure.

Aspects of the present disclosure relate to providing a baseline compensation signal for a capacitive sense channel associated with a capacitive sense array. A baseline capacitance may be used by the capacitive sense channel for touch detection. For example, the baseline capacitance may represent a capacitance when no touch object is present at a corresponding sense channel associated with a unit cell of the capacitive sense array. The baseline capacitance may be compared to a subsequently measured capacitance value to determine if a touch object is present at the unit cell associated with the corresponding sense channel. For example, a change or difference between the subsequently measured capacitance value and the value of the baseline capacitance may indicate the presence of a touch object at the unit cell of the capacitive sense array.

The capacitive sense array may be associated with a spurious capacitance that may reduce the sensitivity for touch detection. For example, a spurious charge or current or a noise signal may be received by the capacitive sense array when providing the baseline capacitance. A baseliner component may be provided to generate a baseline compensation signal to compensate for the spurious current or noise signal that is received by the capacitive sense array when the baseline capacitance is provided. For example, the baseliner component may generate the baseline compensation signal and transmit the baseline compensation signal to the capacitive sense channels of the capacitive sense array that are used for touch detection.

The baseliner component may be implemented with a sensor model and a current conveyor. The sensor model may include multiple capacitors. For example, the sensor model may include a first capacitor corresponding to the operation of the capacitive sense array in a mutual capacitance mode and a second capacitor corresponding to the operation of the capacitive sense array in a self-capacitance mode. The current conveyor may include a differential amplifier and current mirrors that may be used to generate multiple baseline compensation signals based on an output of the sensor model and a voltage reference input signal. The outputs of the current conveyor may be coupled to each sense channel of the capacitive sense array so that the baseline compensation signals may be used to compensate for the spurious current or noise signal that is received by each of the sense channels of the capacitive sense array.

As previously described, the baseliner component may generate the baseline compensation signal that is received by each of the sense channels of the capacitive sense array. The current conveyor of the baseliner component may also receive the current from the sensor model, which may be referred to as a capacitive circuit, and may provide a splitting and scaling function to the current from the sensor model to generate the baseline compensation signals for each of the sense channels of the capacitive sense array.

FIG. 1 is a block diagram illustrating one embodiment of an electronic system having a processing device, including a baseliner component. The electronic system may correspond to a capacitive sense array system. Details regarding the baseliner component 120 are described in more detail with respect to FIGS. 3-8. In some embodiments, the baseliner component 120 may be located in the capacitive sense array 125 and/or the baseliner component 120 of the processing device 110 may be used to configure components (e.g., a gain component) of the baseliner component as described in further detail below. The processing device 110 is configured to detect one or more touches detected proximate to a touch-sensing device, such as capacitive sense array 125. The processing device 110 can detect conductive objects, such as touch objects 140 (fingers or passive styluses, an active stylus 130, or any combination thereof). The capacitance-sensing circuit 101 can measure touch data created by a touch using the capacitive sense array 125. The touch may be detected by a single or multiple sensing cells, each cell representing an isolated sense element or an intersection of sense elements (e.g., electrodes) of the capacitive sense array 125. In one embodiment, when the capacitance-sensing circuit 101 measures mutual capacitance of the touch-sensing device (e.g., using capacitive sense array 125), the capacitance-sensing circuit 101 acquires a 2D capacitive image of the touch-sensing object and processes the data for peaks and positional information. In another embodiment, the processing device 110 is a microcontroller that obtains a capacitance touch signal data set from application processor 150, such as from capacitive sense array 125, and finger detection firmware executing on the microcontroller identifies data set areas that indicate touches, detects and processes peaks, calculates the coordinates, or any combination therefore. The microcontroller can report the precise coordinates to an application processor, as well as other information.

Electronic system 100 includes processing device 110, capacitive sense array 125, stylus 130, and application processor 150. The capacitive sense array 125 may include capacitive sense elements that are electrodes of conductive material, such as copper. The sense elements may also be part of an indium-tin-oxide (ITO) panel. The capacitive sense elements can be used to allow the capacitance-sensing circuit 101 to measure self-capacitance, mutual capacitance, or any combination thereof. In the depicted embodiment, the electronic system 100 includes the capacitive sense array 125 coupled to the processing device 110 via bus 122. The capacitive sense array 125 may include a multi-dimension capacitive sense array. The multi-dimension sense array includes multiple sense elements, organized as rows and columns. In another embodiment, the capacitive sense array 125 is non-transparent capacitive sense array (e.g., PC touchpad). The capacitive sense array 125 may be disposed to have a flat surface profile. Alternatively, the capacitive sense array 125 may have non-flat surface profiles. Alternatively, other configurations of capacitive sense arrays may be used. For example, instead of vertical columns and horizontal rows, the capacitive sense array 125 may have a hexagon arrangement, or the like, as would be appreciated by one of ordinary skill in the art having the benefit of this disclosure. In one embodiment, the capacitive sense array 125 may be included in an ITO panel or a touch screen panel.

The operations and configurations of the processing device 110 and the capacitive sense array 125 for detecting and tracking the touch object 140 and stylus 130 are described herein. In short, the processing device 110 is configurable to detect a presence of the touch object 140, a presence of a stylus 130 on the capacitive sense array 125, or any combination thereof. If the touching object is an active stylus, in one embodiment, the active stylus 130 is configurable to operate as the timing "master," and the processing device 110 adjusts the timing of the capacitive sense array 125 to match that of the active stylus 130 when the active stylus 130 is in use. In one embodiment, the capacitive sense array 125 capacitively couples with the active stylus 130, as opposed to other inductive stylus applications. It should also be noted that the same assembly used for the capacitive sense array 125, which is configurable to detect touch objects 140, is also used to detect and track a stylus 130 without an additional PCB layer for inductively tracking the active stylus 130.

In the depicted embodiment, the processing device 110 includes analog and/or digital general purpose input/output ("GPIO") ports 107. GPIO ports 107 may be programmable. GPIO ports 107 may be coupled to a Programmable Interconnect and Logic ("PIL"), which acts as an interconnect between GPIO ports 107 and a digital block array of the processing device 110 (not shown). The digital block array may be configurable to implement a variety of digital logic circuits (e.g., DACs, digital filters, or digital control systems) using, in one embodiment, configurable user modules ("UMs"). The digital block array may be coupled to a system bus. Processing device 110 may also include memory, such as random access memory ("RAM") 105 and program flash 104. RAM 105 may be static RAM ("SRAM"), and program flash 104 may be a non-volatile storage, which may be used to store firmware (e.g., control algorithms executable by processing core 109 to implement operations described herein). Processing device 110 may also include a memory controller unit ("MCU") 103 coupled to memory and the processing core 109. The processing core 109 is a processing element configured to execute instructions or perform operations. The processing device 110 may include other processing elements as would be appreciated by one of ordinary skill in the art having the benefit of this disclosure. It should also be noted that the memory may be internal to the processing device or external to it. In the case of the memory being internal, the memory may be coupled to a processing element, such as the processing core 109. In the case of the memory being external to the processing device, the processing device is coupled to the other device in which the memory resides as would be appreciated by one of ordinary skill in the art having the benefit of this disclosure.

In one embodiment, the processing device 110 further includes processing logic 102. Some or all of the operations of the processing logic 102 may be implemented in firmware, hardware, or software or some combination thereof. The processing logic 102 may receive signals from the capacitance-sensing circuit 101, and determine the state of the capacitive sense array 125, such as whether an object (e.g., a finger) is detected on or in proximity to the capacitive sense array 125 (e.g., determining the presence of the object), resolve where the object is on the sense array (e.g., determining the location of the object), tracking the motion of the object, or other information related to an object detected at the touch sensor. In another embodiment, processing logic 102 may include capacitance-sensing circuit 101. In another embodiment, processing logic 102 may perform some or all the functions of capacitance-sensing circuit 101 and/or processing device 110.

The processing device 110 may also include an analog block array (not shown) (e.g., field-programmable analog array). The analog block array is also coupled to the system bus. Analog block array may also be configurable to implement a variety of analog circuits (e.g., ADCs or analog filters) using, in one embodiment, configurable UMs. The analog block array may also be coupled to the GPIO 107.

As illustrated, capacitance-sensing circuit 101 may be integrated into processing device 110. Capacitance-sensing circuit 101 may include analog I/O for coupling to an external component, such as touch-sensor pad (not shown), capacitive sense array 125, touch-sensor slider (not shown), touch-sensor buttons (not shown), and/or other devices. The capacitance-sensing circuit 101 may be configurable to measure capacitance using mutual-capacitance sensing techniques, self-capacitance sensing technique, charge-coupling techniques, charge balancing techniques or the like. In one embodiment, capacitance-sensing circuit 101 operates using a charge accumulation circuit, a capacitance modulation circuit, or other capacitance sensing methods known by those skilled in the art. In an embodiment, the capacitance-sensing circuit 101 is of the Cypress TMA-3xx, TMA-4xx, or TMA-xx families of touch screen controllers. Alternatively, other capacitance-sensing circuits may be used. The mutual capacitive sense arrays, or touch screens, as described herein, may include a transparent, conductive sense array disposed on, in, or under either a visual display itself (e.g. LCD monitor), or a transparent substrate in front of the display. In an embodiment, the transmit (TX) and receive (RX) electrodes are configured in rows and columns, respectively. It should be noted that the rows and columns of electrodes can be configured as TX or RX electrodes by the capacitance-sensing circuit 101 in any chosen combination. In one embodiment, the TX and RX electrodes of the sense array 125 are configurable to operate as a TX and RX electrodes of a mutual capacitive sense array in a first mode to detect touch objects, and to operate as electrodes of a coupled-charge receiver in a second mode to detect a stylus on the same electrodes of the sense array. The stylus, which generates a stylus TX signal when activated, is used to couple charge to the capacitive sense array, instead of measuring a mutual capacitance at an intersection of a RX electrode and a TX electrode (a sense element) as done during mutual-capacitance sensing. An intersection between two sense elements may be understood as a location at which one sense electrode crosses over or overlaps another, while maintaining galvanic isolation from each other. The capacitance associated with the intersection between a TX electrode and an RX electrode can be sensed by selecting every available combination of TX electrode and RX electrode. When a touch object, such as a finger or stylus, approaches the capacitive sense array 125, the object causes a decrease in mutual capacitance between some of the TX/RX electrodes. In another embodiment, the presence of a finger increases the capacitance of the electrodes to the environment (Earth) ground, typically referred to as self-capacitance change. Utilizing the change in mutual capacitance, the location of the finger on the capacitive sense array 125 can be determined by identifying the RX electrode having a decreased coupling capacitance between the RX electrode and the TX electrode to which the TX signal was applied at the time the decreased capacitance was measured on the RX electrode. Therefore, by sequentially determining the capacitances associated with the intersection of electrodes, the locations of one or more touch objects can be determined. It should be noted that the process can calibrate the sense elements (intersections of RX and TX electrodes) by determining baselines for the sense elements. It should also be noted that interpolation may be used to detect finger position at better resolutions than the row/column pitch as would be appreciated by one of ordinary skill in the art having the benefit of this disclosure. In addition, various types of coordinate interpolation algorithms may be used to detect the center of the touch as would be appreciated by one of ordinary skill in the art having the benefit of this disclosure.

The capacitance-sensing circuit 101 includes the baseliner component 120. In addition, the baseliner component 120 may be used in conjunction with various components to provide a baseline compensation signal for sense channels of the capacitive sense array. Additional details of the baseliner component 120 are described below with respect to FIGS. 3-8. The baseliner component may be implemented on or off chip.

Processing device 110 may include internal oscillator/clocks 106 and communication block ("COM") 108. In another embodiment, the processing device 110 includes a spread-spectrum clock (not shown). The oscillator/clocks block 106 provides clock signals to one or more of the components of processing device 110. Communication block 108 may be used to communicate with an external component, such as an application processor 150, via application interface ("I/F") line 151.

Processing device 110 may reside on a common carrier substrate such as, for example, an integrated circuit ("IC") die substrate, a multi-chip module substrate, or the like. Alternatively, the components of processing device 110 may be one or more separate integrated circuits and/or discrete components. In one exemplary embodiment, processing device 110 is the Programmable System on a Chip (PSoC®) processing device, developed by Cypress Semiconductor Corporation, San Jose, Calif. Alternatively, processing device 110 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to an application processor, but may include a system that measures the capacitance on the sensing device and sends the raw data to a host computer where it is analyzed by an application. In effect, the processing that is done by processing device 110 may also be done in the application processor.

Capacitance-sensing circuit 101 may be integrated into the IC of the processing device 110, or alternatively, in a separate IC. Alternatively, descriptions of capacitance-sensing circuit 101 may be generated and compiled for incorporation into other integrated circuits. For example, behavioral level code describing the capacitance-sensing circuit 101, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout may represent various levels of abstraction to describe capacitance-sensing circuit 101.

It should be noted that the components of electronic system 100 may include all the components described above. Alternatively, electronic system 100 may include some of the components described above.

In one embodiment, the electronic system 100 is used in a tablet computer. Alternatively, the electronic device may be used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, an eBook reader, global position system ("GPS") or a control panel. The embodiments described herein are not limited to touch screens or touch-sensor pads for notebook implementations, but can be used in other capacitive sensing implementations, for example, the sensing device may be a touch-sensor slider (not shown) or touch-sensor buttons (e.g., capacitance sensing buttons). In one embodiment, these sensing devices include one or more capacitive sensors or other types of capacitance-sensing circuitry. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc.) handwriting recognition, and numeric keypad operation.

Figure 2:
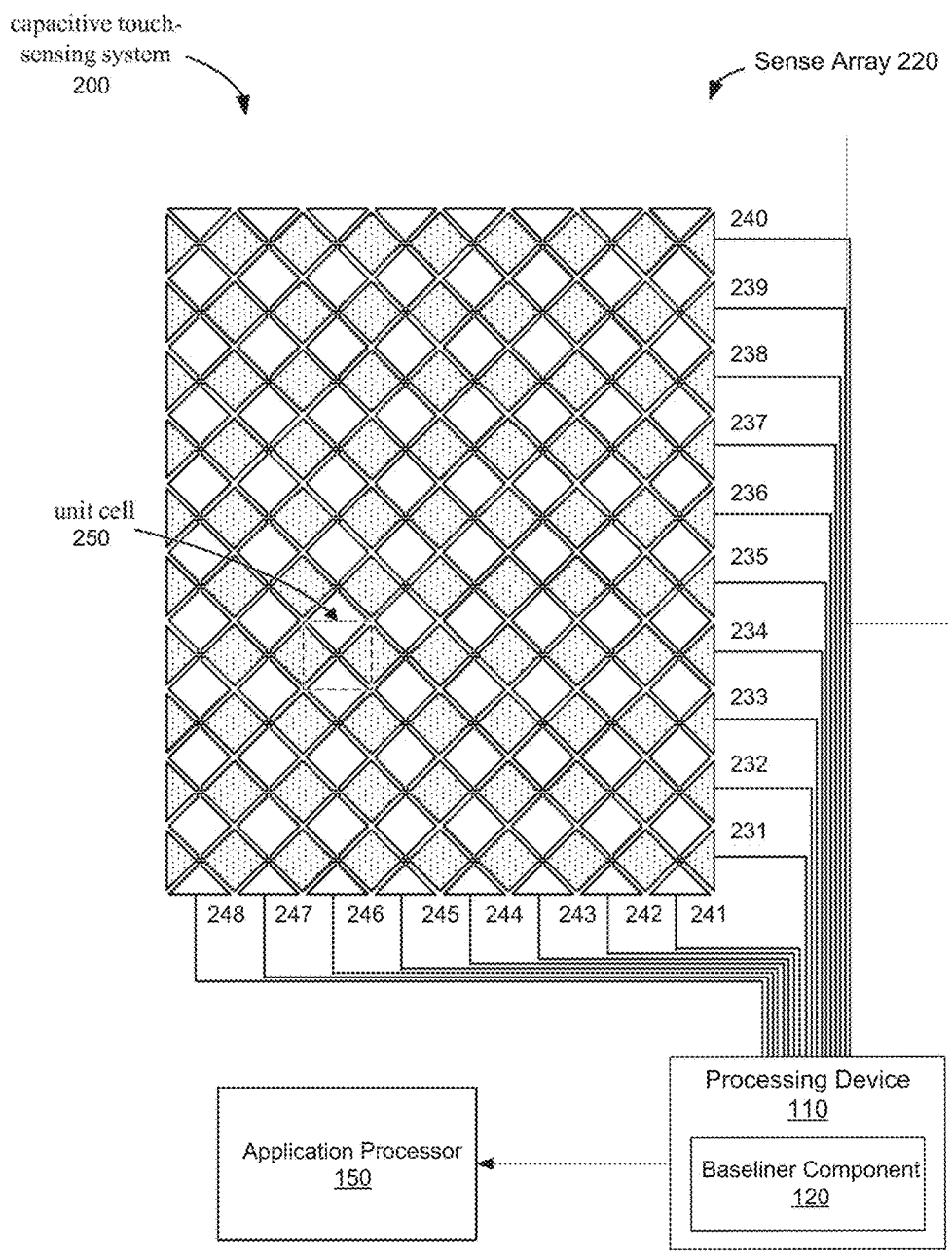
FIG. 2 illustrates a capacitive touch sensing system in accordance with some embodiments.

FIG. 2 illustrates a capacitive touch-sensing system, according to one embodiment. Capacitive touch-sensing system 200 includes a sense array 220. Sense array 220 may be a capacitive sense array. Sense array 220 includes multiple row electrodes 231-240 and multiple column electrodes 241-248. The row and column electrodes 231-248 are connected to a processing device 110, which may include the functionality of capacitance-sensing circuit 101, as illustrated in FIG. 1. In one embodiment, the processing device 110 may perform mutual capacitance measurement scans and/or self capacitance measurement scans of the sense array 220 to measure a mutual capacitance value or a self capacitance value associated with each of the intersections between a row electrode and a column electrode in the sense array 220. The measured capacitances may be further processed to determine centroid locations of one or more contacts of conductive objects proximate to the sense array 220.

In one embodiment, the processing device 110 is connected to an application processor 150 which may receive the measured capacitances or calculated centroid locations from the processing device 110.

The sense array 220 illustrated in FIG. 2 includes electrodes arranged to create a pattern of interconnected diamond shapes. Specifically, the electrodes 231-248 of sense array 220 form a single solid diamond (SSD) pattern. In one embodiment, each intersection between a row electrode and a column electrode defines a unit cell. Each point within the unit cell is closer to the associated intersection than to any other intersection. For example, unit cell 250 contains the points that are closest to the intersection between row electrode 234 and column electrode 246. Thus, the unit cell may be considered to include a pair of electrodes, or may alternatively include a single electrode.

In one embodiment, capacitive touch-sensing system 200 may collect data from the entire touch-sensing surface of sense array 220 by performing a scan to measure capacitances of the unit cells that comprise the touch-sensing surface, then process the touch data serially or in parallel with a subsequent scan. For example, one system that processes touch data serially may collect raw capacitance data from each unit cell of the entire touch-sensing surface, and filter the raw data. Based on the filtered raw data, the system may determine local maxima (corresponding to local maximum changes in capacitance) to calculate positions of fingers or other conductive objects, then perform post processing of the resolved positions to report locations of the conductive objects, or to perform other functions such as motion tracking or gesture recognition.

In one embodiment, capacitive touch-sensing system 200 may be configured to perform both of self-capacitance sensing and mutual capacitance sensing. In one embodiment, capacitive touch-sensing system 200 is configured to perform self-capacitance sensing, in sequence or in parallel, to measure the self-capacitance of each row and column electrode of the touch-sensing surface (e.g., sense array 220), such that the total number of sense operations is N+M, for a capacitive-sense array having N rows and M columns. In one embodiment, capacitive touch sensing system 200 may be capable of connecting individual electrodes together to be sensed in parallel with a single operation. For example, multiple row (e.g., electrodes 231-240) and or column electrodes (e.g., electrodes 241-248) may be coupled together and sensed in a single operation to determine whether a conductive object is touching or near the touch-sensing surface. In an alternate embodiment, the capacitive touch-sensing system 200 may be capable of connecting each row electrode to it is own sensing circuit such that all row electrodes may be sensed in parallel with a single operation. The capacitive touch-sensing system 200 may also be capable of connecting each column electrode to its own sensing circuit such that all column electrodes may be sensed in parallel with a single operation. The capacitive touch-sensing system 200 may also be capable of connecting all row and column electrodes to their own sensing circuits, such that all row and column electrodes may be sensed in parallel with a single operation.

In one embodiment, the capacitive touch-sensing system 200 may perform mutual capacitance sensing of the touch-sensing surface (e.g., sense array 220) by individually sensing each intersection between a row electrode and a column electrode. Thus, a total number of sense operations for a capacitive-sense array (e.g., sense array 220) having X rows and Y columns is X×Y. In one embodiment, performing a mutual capacitance measurement of a unit cell formed at the intersection of a row electrode and a column electrode includes applying a signal (TX) to one electrode and measuring characteristics of the signal on another electrode resulting from the capacitive coupling between the electrodes.

In one embodiment, multiple capacitance-sensing circuits may be used in parallel to measure a signal coupled to multiple column electrodes simultaneously, from a signal applied to one or more row electrodes. In one embodiment, for a capacitive-sense array (e.g., sense array 220) having X rows, Y columns, and N columns that can be sensed simultaneously, the number of mutual capacitance sensing operations is the smallest whole number greater than or equal to X×Y/N.

In one embodiment, each update of the touch locations may include a sensing portion and a non-sensing portion. The sensing portion may include measurement of capacitance associated with intersections between electrodes, while the non-sensing portion may include calculation of touch locations based on the capacitance measurements and reporting of the calculated touch locations to a host device. In one embodiment, capacitive touch-sensing system 200 includes baseliner component 120.

Figure 3:
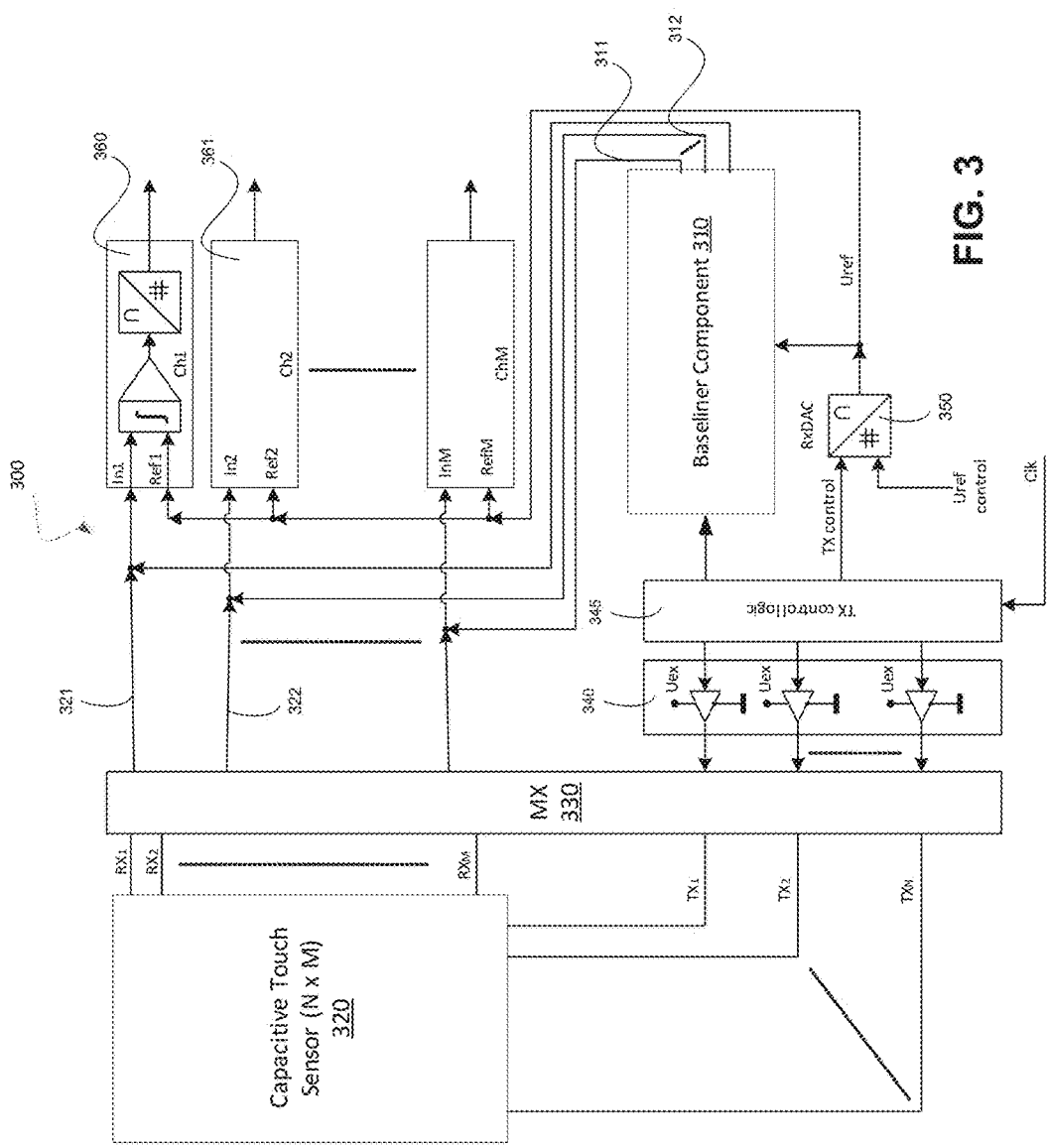
FIG. 3 is a block diagram of a baseliner component associated with sense channels in accordance with some embodiments.

FIG. 3 is a block diagram of a baseliner component associated with sense channels of a capacitive touch-sensing system. In general, the baseliner component 310 may correspond to the baseliner component 120 of FIGS. 1 and 2.

As shown in FIG. 3, a capacitive touch-sensing system 300 may include a baseliner component 310 (also referred to as a baseliner circuit) that may provide multiple output signals (i.e., a baseline compensation signals or currents) to sense channels of the capacitive touch-sensing system. For example, a first output of the baseliner component 310 that corresponds to a first output current or baseline compensation signal may be coupled to a first sense channel (e.g., an RX sense channel or RX channel) of the capacitive touch-sensing system and a second output of the same baseliner component 310 that corresponds to a second output current or baseline compensation signal may be coupled to a second sense channel of the same capacitive touch-sensing system. The baseliner component 310 may generate the output currents or baseline compensation signals based on a TX signal (e.g., from a TX driver). The output currents of the baseliner component 310 may be referred to as baseline compensation signals that are used to compensate for spurious charge or noise signals received from the capacitive touch sensor 320 in the capacitive touch-sensing system 300 (e.g., associated with transmitting of the TX signal to electrodes of the capacitive touch sensor 320). In some embodiments, the baseliner component 310 may generate multiple baseline compensation signals to each of the sense channels of the capacitive touch-sensing system 300. For example, a first output 311 of the baseliner component 310 may be coupled to a first sense channel 360 of the capacitive touch-sensing system and a second output 312 of the baseliner component 310 may be coupled to a second sense channel 361. The first output 311 and the second output 312 of the baseliner component 310 may be a similar or identical signal. The baseliner component 310 may generate the baseline compensation signals based on a combination of the TX signal and a voltage input from a digital to analog converter (DAC) associated with the receive (RX) sense channel. Further details with regard to the architecture and circuitry of the baseliner component 310 are described in relation to FIGS. 4-5.

Referring to FIG. 3, the capacitive touch-sensing system 300 may include a capacitive touch sensor 320 that may correspond to the sense array 220 of FIG. 2. The capacitive touch sensor 320 may be coupled to the sensing system through a multiplexor 330. For example, the capacitive touch sensor 320 may be coupled to the multiplexor 330 that may receive RX signals from the capacitive touch sensor 320 and may transmit TX signals to the capacitive touch sensor 320. The RX signals from the capacitive touch sensor 320 may be received by the multiplexor 330 which may transmit the RX signals to corresponding sense channels of the capacitive touch-sensing system 300. For example, a first RX signal 321 may be transmitted to the first sense channel 360 and a second RX signal 322 may be transmitted to the second sense channel 361.

The sense channels of the capacitive touch-sensing system 300 may perform a charge conversion function based on the RX signals that are received from the capacitive touch sensor 320. In some embodiments, each of the sense channels may receive a first input corresponding to a current (e.g., a corresponding RX signal) based on the capacitive touch sensor 320 and a second input corresponding to a reference input signal. A sense channel may include an integrator component that receives the first input corresponding to the RX signal and the second input corresponding to the reference input signal and may collect or accumulate a charge from the capacitive touch sensor 320 after excitation represented by the RX signal. The accumulated charge may be represented by a voltage on the output of the integrator and may be converted to a digital signal by an analog to digital converter (ADC). In some embodiments, the ADC of the sense channel may perform the conversion from the analog signal to the digital signal by comparing the accumulated charge of the integrator with the reference input signal. The digital representation of the accumulated charge may then be transmitted to a microcontroller.

As shown in FIG. 3, the capacitive touch-sensing system 300 may further include TX drivers 340 that may provide the TX signals to the capacitive touch sensor 320 via the multiplexor 330. In some embodiments, the TX drivers 340 may transmit TX signals based on TX control logic 345. The TX control logic 345 may control the TX drivers 340 to generate the TX signals for drive alternation of excitation voltages across the electrodes of the capacitive touch sensor 320. In some embodiments, the TX control logic 345 may be synchronized by a clock signal that may correspond to a capacitive touch-sensing system 300 clock signal. In the same or alternative embodiments, the excitation of the electrodes of the capacitive touch sensor 320 (e.g., by the TX signals) may be directly applied to the electrodes when operating in a mutual capacitance sensing mode or through an RX digital to analog converter (DAC), also referred to as an RxDAC 350) to inputs of the sense channels (e.g., the reference input signal) when operating in a self-capacitance measuring mode. Furthermore, when operating in the mutual capacitance measuring mode, the Rx DAC 350 may generate a constant voltage corresponding to the midpoint of the supply voltage used by the capacitive touch-sensing system 300.

In some embodiments, the TX signal received by the baseliner component 310 (e.g., via the TX control logic 345)

may have the same frequency, shape, and amplitude of the TX signals transmitted from the TX drivers 340 to the capacitive touch sensor 320. The TX signal received by the baseliner component 310 may be received each time that one of the TX drivers 340 transmits another TX signal to the capacitive touch sensor 320. Thus, the TX signal received by the baseliner component 310 may be received each time that the TX drivers 340 transmits another TX signal to the capacitive touch sensor 320. For example, the TX signal from the TX drivers 340 may be transmitted to electrode of the capacitive touch sensor 320 in a sequential manner in time according to a scanning procedure and the TX signal may further be transmitted to the baseliner component 310 each time that a TX signal is transmitted from the TX drivers to the electrodes of the capacitive touch sensor 320.

As such, the capacitive touch-sensing system 300 may include a baseliner component 310 that may generate baseline compensation signals. The sense channels of the capacitive touch-sensing system 300 may receive an input signal based on the RX signals of the capacitive touch sensor 320 of the capacitive touch-sensing system 300. The sense channels may further receive a reference input signal that may be used when converting the analog signal corresponding to the accumulated charge at an integrator to a digital value. The baseline compensation signals may be combined with the RX signals based on a capacitive circuit that generates an output based on a TX signal and the reference input signal.

Figure 4:
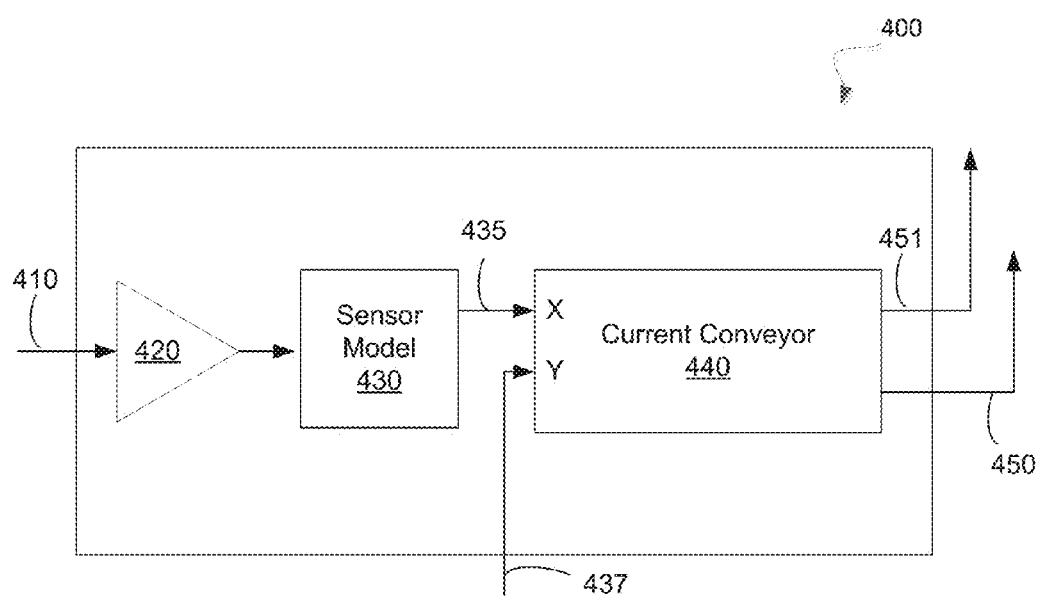
FIG. 4 is a block diagram of an architecture of a baseliner component in accordance with some embodiments of the present disclosure.

FIG. 4 is a block diagram of an example architecture of a baseliner component 400. In general, the baseliner component 400 may correspond to the baseliner component 120 of FIGS. 1 and 2 or the baseliner component 310 of FIG. 3.

As shown in FIG. 4, the architecture of the baseliner component 400 may include a buffer 420, a sensor model 430 (also referred to as a capacitive circuit), and a current conveyor 440. The baseliner component 400 may receive a TX input signal 410 that is received by the buffer 420. The output of the buffer 420 (e.g., the TX input signal 410) may be coupled to the sensor model 430. In some embodiments, the sensor model 430 may include one or more capacitive circuits or capacitors that may be used to approximate a current that is detected or generated by the capacitive circuits in response to the TX input signal 410. The output signal 435 of the sensor model 430 may be coupled to an input of the current conveyor 440. For example, the output signal 435 of the sensor model 430 may be received by an X input of the current conveyor 440.

The current conveyor 440 (also referred to as a current to current convertor) may receive the output signal 435 of the sensor model 430 as a first input (e.g., an X input) and a second input (e.g., a Y input) corresponding to the reference voltage input signal 437 that is generated from an DAC based on a TX control signal as described with relation to the RxDAC 350. The current conveyor 440 may then generate multiple output signals (i.e., baseline compensation signals) for each sense channel. For example, the current conveyor 440 may generate multiple baseline compensation signals 450 and 451 to different sense channels. The X input of the current conveyor 440 may be associated with a zero impedance current and the Y input may be associated with a convertor operation point. The voltages corresponding to the X and Y inputs may be similar. In some embodiments, the current conveyor may be a second generation current conveyor (CCII) that may provide an output (e.g., the output signals or baseline compensation signals) from the output of the sensor model 430. Further details with regard to the sensor model 430 and the current conveyor 440 are described in relation to FIGS. 5 and 6.

Figure 5:
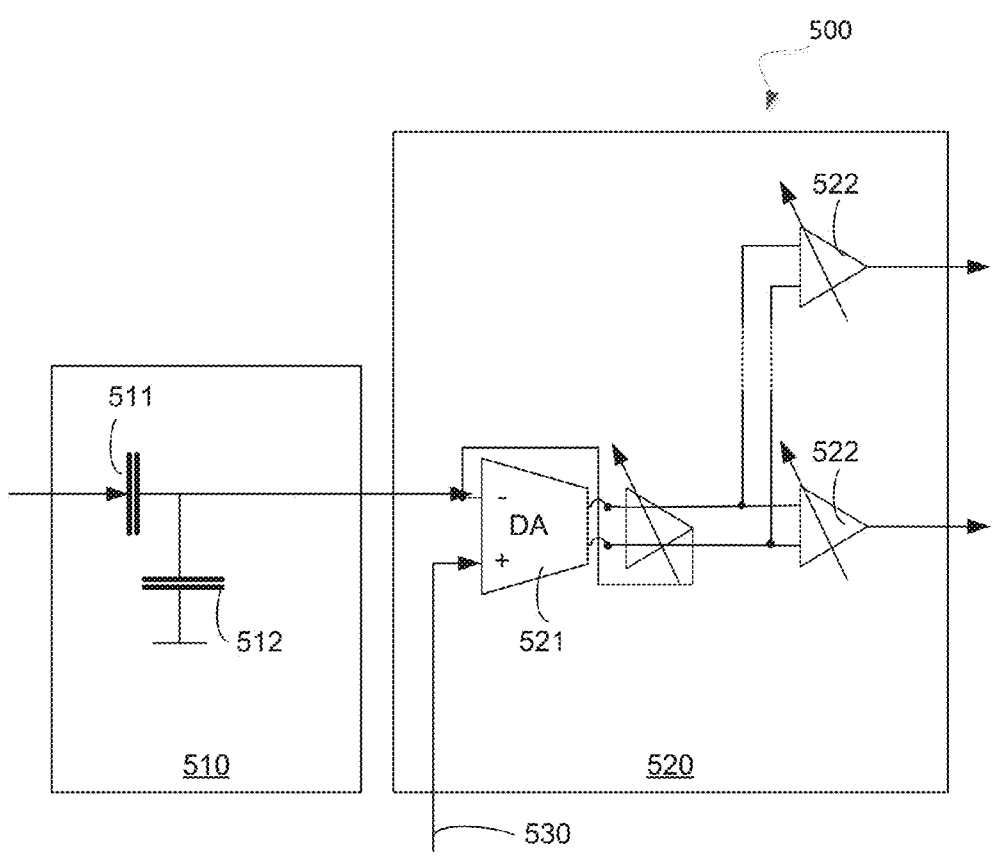
FIG. 5 is a block diagram of an example circuit of a baseliner component in accordance with some embodiments.

FIG. 5 is a block diagram of an example circuit of a baseliner component 500. In general, the baseliner component 500 may correspond to the baseliner component 120 of FIGS. 1 and 2, the baseliner component 310 of FIG. 3, or the baseliner component 400 of FIG. 4.

As shown in FIG. 5, the baseliner component 500 may include a sensor model or capacitive circuit 510 that may correspond to the sensor model 430. The sensor model or capacitive circuit 510 may include a first capacitor 511 corresponding to a capacitor used for a mutual capacitance measuring mode and a second capacitor 512 corresponding to another capacitor that is used for a self-capacitance measuring mode.

The baseliner component 500 may further include a current conveyor 520 that may correspond to the current conveyor 440. As shown, the current conveyor 520 may include a differential amplifier 521 and current mirrors 522. The differential amplifier 521 may receive the output of the sensor model or capacitive circuit 510 and a reference input signal 530 and may generate an output current that is received by the current mirrors 522. In some embodiments, the differential amplifier 521 may amplify the difference between two input voltages. Thus, the differential amplifier 521 may amplify the voltage difference between the first input to the current conveyor that corresponds to a voltage corresponding to an output of the sensor model or capacitive circuit and the second input to the current conveyor that corresponds to an output of a DAC that corresponds to a reference input signal. Furthermore, each of the current mirrors 522 may receive the output of the differential amplifier 521 and may copy or reproduce (i.e., split) the output current from the differential amplifier 521 to generate a mirrored output current (or mirrored current output). Furthermore, in some embodiments, the output current from the current mirrors 522 may be modified. For example, a gain factor (i.e., a scaling) may be applied to the output currents from the current mirrors 522 to increase the amplitude or magnitude of the output currents relative to the output of the differential amplifier 521. In some embodiments, the gain factor may be applied based on a gain component. Thus, the current mirrors 522 may receive the output signal of the differential amplifier 521 and may reproduce the output signal and/or may reproduce the output signal and apply a gain factor to the output signal. Each of the current mirrors 522 may further be coupled to a sense channel of a capacitive sense array.

Thus, the baseliner component may include a capacitive circuit or sensor model and a current conveyor. A differential amplifier of the current conveyor may generate an output signal based on a difference between the output of the capacitive circuit and a reference input signal. Current mirrors of the current conveyor may reproduce or copy the output signal of the differential amplifier and each current mirror may provide an output signal to a different sense channel. The output signals of each of the current mirrors may be referred to as the baseline compensation signal that is received by each of the sense channels of the capacitive sense array. Furthermore, the current conveyor may receive a gain control input signal. Each of the current mirrors may apply a gain factor to the output of the differential amplifier based on the gain control input. In some embodiments, the current mirror may correspond to an inverting current amplifier that may reverse a current direction. In some embodiments, the current conveyor may correspond to an operational amplifier with a feedback where the X input with the feedback loop corresponds to approximately a zero impedance.

Figure 6:
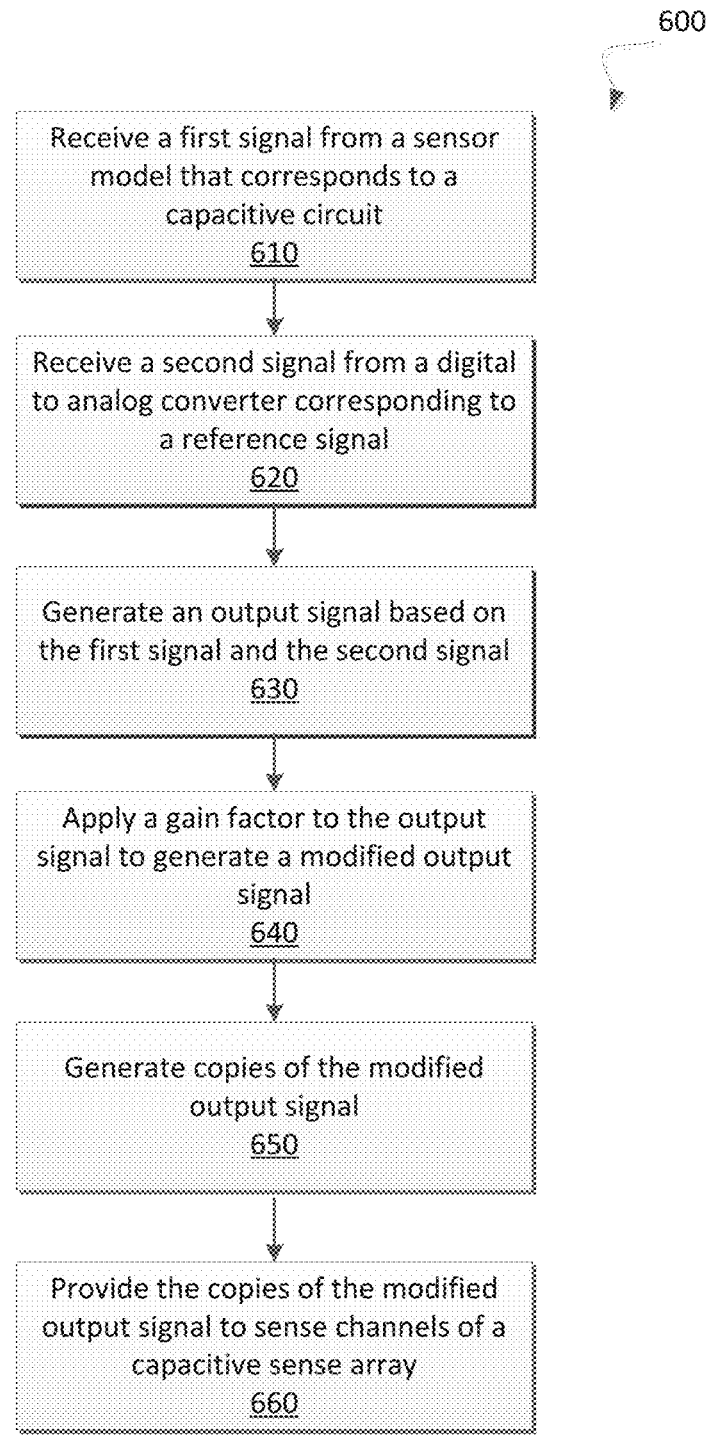
FIG. 6 illustrates an example method to provide a baseline compensation signal in accordance with some embodiments.

FIG. 6 illustrates an example method 600 to provide a baseline compensation signal. The method 600 may be performed by processing logic that may include hardware (circuitry, dedicated logic, etc.), software (such as is run on a general purpose computing system or a dedicated machine), firmware (embedded software), or any combination thereof. In general, the baseliner component 120, 310, 400, or 500 of FIGS. 1-5 may perform the method 600.

As shown in FIG. 6, the method 600 may begin with the processing logic receiving a first signal from a sensor model that corresponds to a capacitive circuit (block 610). The first signal may be received by a current conveyor or a differential amplifier of the current conveyor. In some embodiments, the first signal may be based on a TX signal as previously described. The processing logic may further receive a second signal from a digital to analog converter (block 620). For example, the second signal may be received by the differential amplifier of the current conveyor from the Rx DAC as previously described. In some embodiments, the second signal may be a reference input signal (e.g., a voltage reference signal from a voltage source) that is further received by sense channels of the capacitive sense array. The processing logic may subsequently generate an output signal based on the first signal and the second signal (block 630). For example, the differential amplifier of the current conveyor may generate an output signal based on a difference between the first signal and the second signal. Subsequently, a gain factor may be applied to the output signal to generate a modified output signal (block 640). For example, a gain factor input signal may be received by the current conveyor and the power or amplitude of the output signal may be increased or modified based on the gain factor to generate the modified output signal. Subsequently, the processing logic may reproduce or copy the modified output signal (block 650). For example, current mirrors of the current conveyor may receive the modified output signal and may reproduce or copy the modified output signal. In some embodiments, the number of current mirrors may correspond to or equal the number of sense channels of the capacitive sense array. Furthermore, the processing logic may provide the mirrored outputs to the sense channels of the capacitive sense array (block 660). For example, each sense channel may receive one output from one of the current mirrors where each current mirror provides its output to one of the sense channels.

Figure 7:
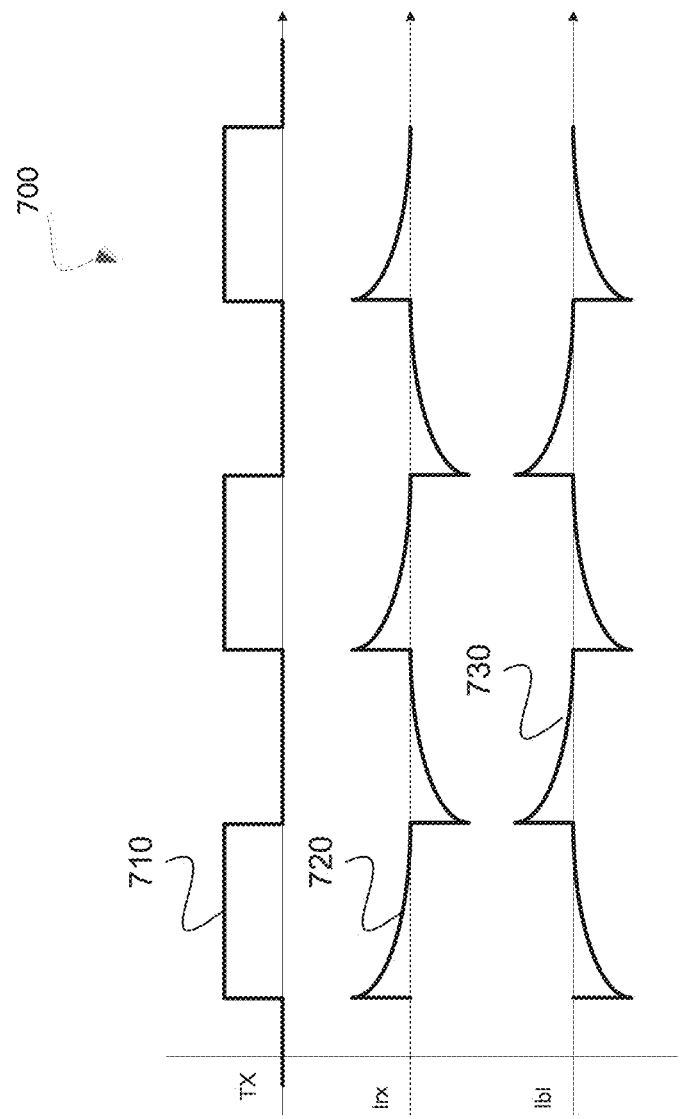
FIG. 7 illustrates an example timing diagram of signals associated with the capacitive sense array in a mutual capacitance measuring mode in accordance with some embodiments of the present disclosure.

FIG. 7 illustrates an example timing diagram 700 of signals associated with the capacitive sense array in a mutual capacitance measuring mode. The timing diagram 700 may correspond to an output signal of a baseliner component 120, 310, 400, or 500 of FIGS. 1-5.

As shown in FIG. 7, the timing diagram 700 illustrates the baseline compensation signal 730 (e.g., $I_{bl}$), the input to a sense channel 720 (e.g., $I_{rx}$) that is received through the capacitive touch sensor, and the TX signal that is transmitted to a capacitive touch sensor and/or the sensor model or capacitive circuit (e.g., a TX signal). In operation, an output voltage of the Rx DAC that is received by the current conveyor may be constant. The TX drivers of the capacitive sense array may alternate a voltage on the sensor model of the baseliner component as well as the electrodes of the capacitive touch sensor. The alternation of the voltage on the sensor model and the sensor electrodes may lead to a mutual capacitance of the sensor and the sensor model recharging. The capacitive recharging may result in the generation of a current in a sense channel as well as the current conveyor of the baseliner component (e.g., the output of the sensor model). The current conveyor may repeat the direction of the received current and the output of the current mirrors of the current conveyor may be the opposite to the current that is received in the sense channel.

Figure 8:
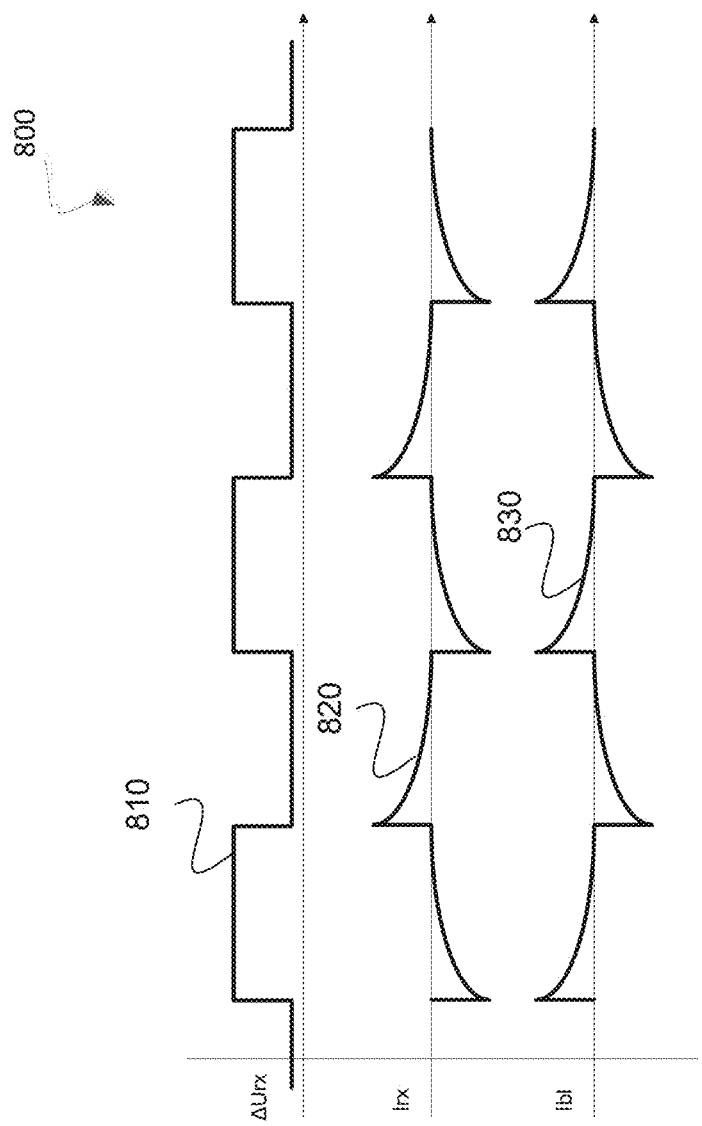
FIG. 8 illustrates an example-timing diagram of signals associated with the capacitive sense array in a self-capacitance measuring mode in accordance with some embodiments of the present disclosure.

FIG. 8 illustrates an example timing diagram 800 of signals associated with the capacitive sense array in a self-capacitance measuring mode. The timing diagram 800 may correspond to an output signal of a baseliner component 120, 310, 400, or 500 of FIGS. 1-5.

As shown in FIG. 8, the timing diagram 800 illustrates the baseline compensation signal 830 (e.g., $I_{bl}$), the input to a sense channel 820 (e.g., $I_{rx}$), and a reference signal 810 (e.g., $U_{ref}$) that is received by both the baseliner component (e.g., the Y input of the current conveyor) as well as a sense channel as a reference input signal. In some embodiments, the TX signal as illustrated in FIG. 7 may be set to zero in the self-capacitance measuring mode. The Rx DAC may swing the reference signal 810 in a reference range. The swinging or changing of the reference signal 810 may be controlled by a TX control signal corresponding to the TX drivers of the capacitive sense array. The reference signal 810 may be repeated on the X input of the current conveyor and may lead to the recharging of the capacitive touch sensor of the capacitive sense array and the sensor model.

Correlation of Components of a Capacitive Touch Sensing System to Reduce Noise

Aspects of the present disclosure may further correlate components of a capacitive touch sensing system. For example, a first signal from a first component may be correlated with a second signal from a second component. As an example, a baseline compensation signal may be provided with digitally controlled current sources. However, the use of the current sources may result in a variation in the current source that may contribute to noise or a spurious signal in the capacitive sense array. The introduction of the noise or spurious signal may reduce the sensitivity of the capacitive sense array for touch detection. Aspects of the present disclosure may establish a correlation between components of a capacitive touch sensing system to reduce the noise impact of the variation of the current source.

Figure 9:
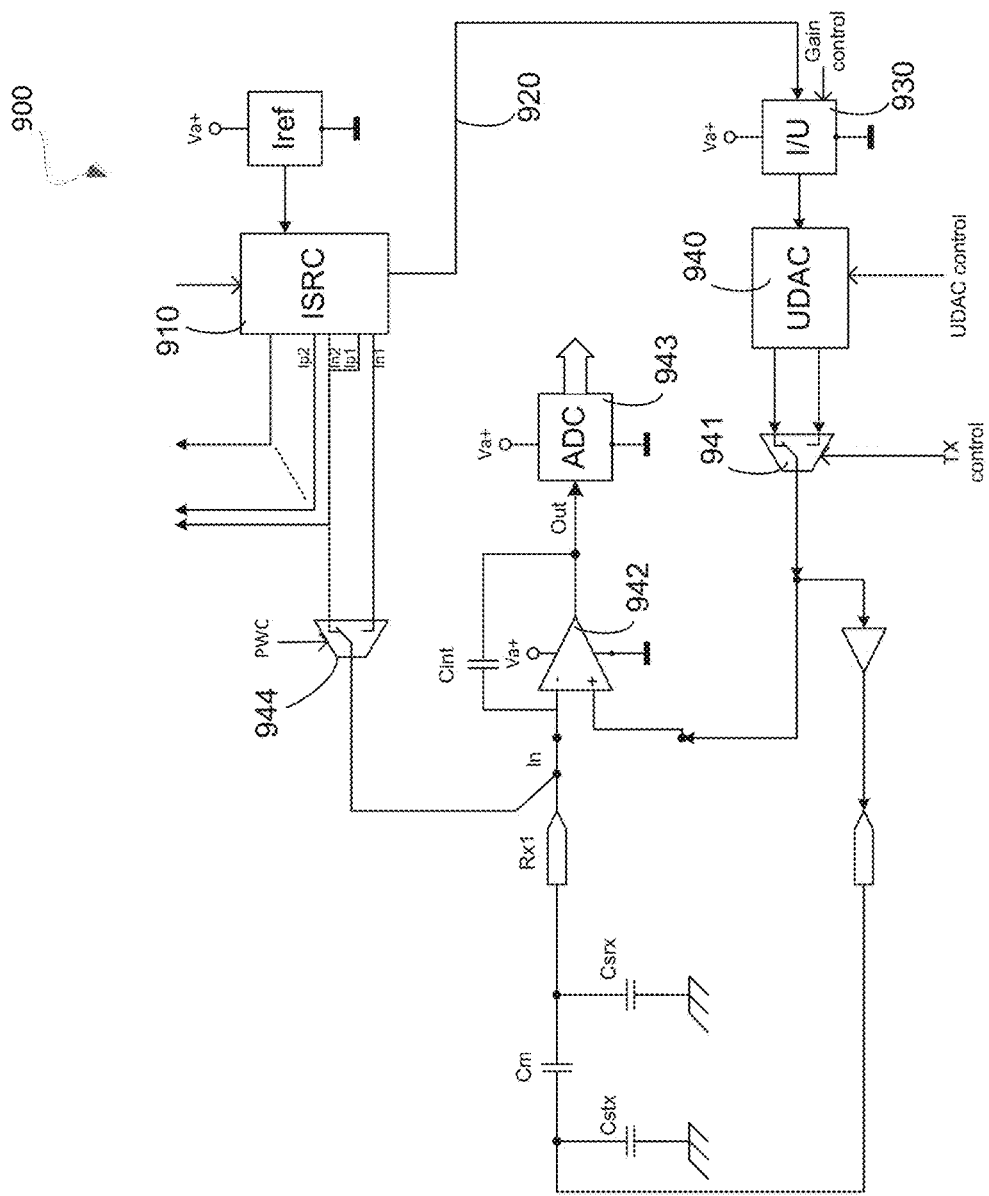
FIG. 9 is a block diagram of a capacitive touch sensing system with a signal correlation implementation in accordance with some embodiments.

FIG. 9 is a block diagram of a capacitive touch sensing system 900 with a correlation implementation.

As shown in FIG. 9, the capacitive touch sensing system 900 may include a sense channel that includes an integrator component 942 and an analog to digital converter (ADC) 943. The sense channel of the capacitive touch sensing system 900 may correspond to the operations of the sense channel 360. A first input to the sense channel may be received from a current source (ISRC) component 910 via a multiplexor 944 (or switch) that is controlled by a pulse width control signal. For example, the ISRC component 910 may include two outputs for each sense channel of the capacitive sense array. For a sense channel, a first output (e.g., $I_n$) and a second output (e.g., $I_p$) may be coupled to the multiplexor 944 so that one of the output currents of the ISRC component 910 are applied to the input of the integrator component 942 of the sense channel. In some embodiments, the integrator component 942 may be based on an operational amplifier. A measured charge may be represented from a voltage in the integration capacitor (e.g., $C_{int}$) associated with the integrator component 942. Furthermore, the output of the integrator component 942 may be coupled to the ADC 943 that may convert the output into digital form as previously described. In the same or alternative embodiments, the time in which each of the first input and the second input are applied to the input of the integrator component 942 are determined by the pulse width control signal of the multiplexor 944. The use of the pulse width control signal in combination with the current source component 910 may provide a baseline compensation signal to the sense channel to reduce noise or spurious signals that may be received by the sense channel.

However, the current source component 910 that is used with the pulse width control signal may introduce noise into the sense channel. A correlation between the ISRC component 910 and a digital to analog converter (e.g., UDAC) used to generate a reference input signal to the sense channel may be implemented to reduce the impact of the noise that is introduced in to the sense channel from the ISRC component 910.

As shown in FIG. 9, the reference voltage source of the UDAC component 940 is coupled to a current to voltage (I/U) convertor component 930. The I/U convertor component 930 may be coupled to the ISRC component 910 via a signal path 920. For example, an input of the I/U convertor component 940 may be coupled to an output of the ISRC component 910. Thus, the I/U convertor component 940 may be considered to be sourced by a current from the ISRC component 910 via the signal path 920. The current that is used to source the I/U converter component 940 may be the same current that is used to input signal to the sense channel (e.g., via multiplexor or switch 944). In some embodiments, the I/U convertor component 930 may further include a digitally controlled gain component to generate a voltage on the output of the I/U convertor component 930 which may be approximate to the value of a reference voltage used by a sense channel. Thus, the UDAC component 940 that generates the reference signal for the sense channel is sourced by the same current from the ISRC component 910 that generates the current for the input signal of the same sense channel. As such, any variation introduced by the ISRC component 910 may be correlated or introduced to the output of the UDAC component 940.

Figure 10:
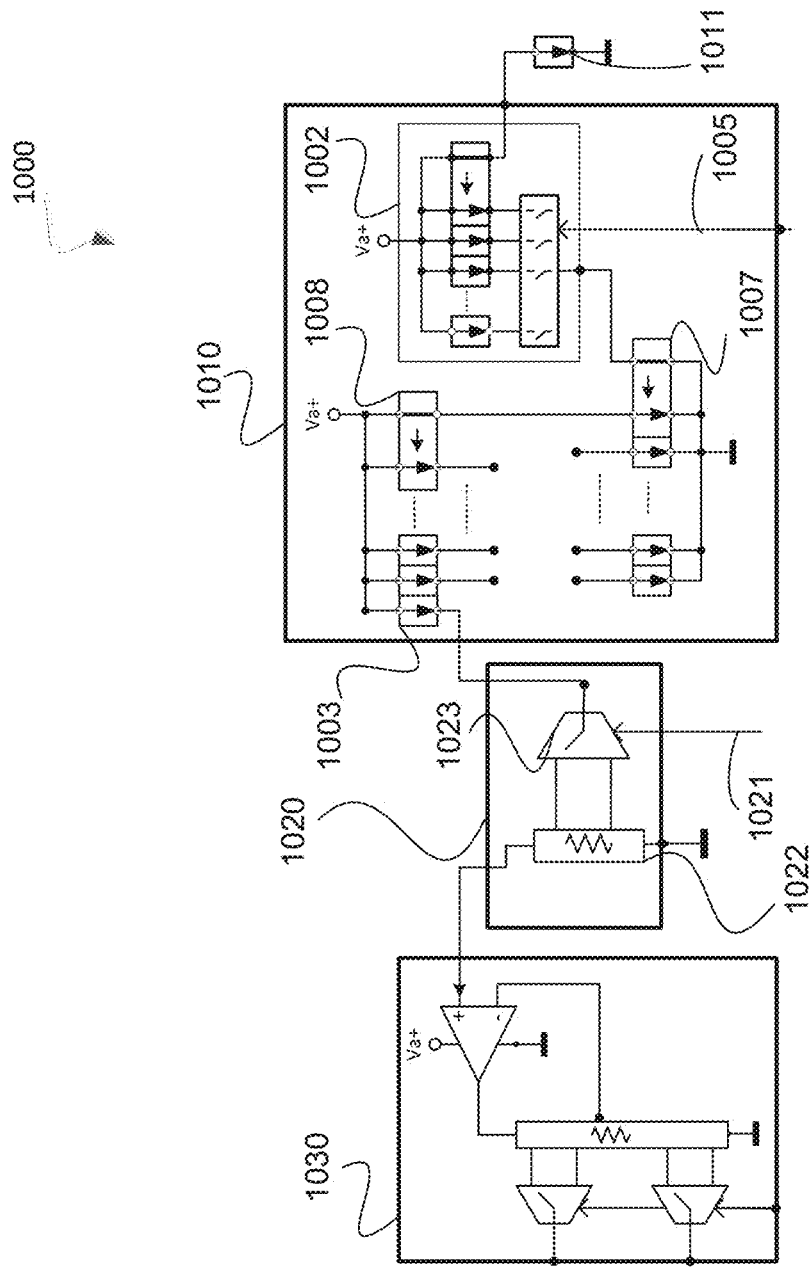
FIG. 10 is a block diagram of an architecture associated with correlating signals of the capacitive touch sensing system in accordance with some embodiments.

FIG. 10 is a block diagram of an architecture 1000 associated with correlating signals of the capacitive touch sensing system. In general, the architecture 1000 may include a UDAC component 1030 that may correspond to the UDAC component 940 of FIG. 9, an I/U convertor component 1020 that may correspond to the I/U convertor component 930 of FIG. 9, and an ISRC component 1010 that may correspond to the ISRC component 910 of FIG. 9.

As shown in FIG. 10, the architecture 1000 may include an ISRC component 1010, an I/U convertor component 1020, and a UDAC component 1030. The ISRC component 1010 may receive an input reference current source 1011 and provide multiple output currents. The ISRC component 1010 may include a current to current convertor (IDAC) component 1002 that is digitally controlled via a control signal 1005. The IDAC component 1002 may include current mirrors that may scale (e.g., apply a gain factor to) the input current from the input reference current source 1011 based on the control signal 1005. Furthermore, as shown, the current mirrors of the IDAC component 1002 may be coupled to a set of switches that may be operated based on the control signal 1005. Thus, the output current of the IDAC component 1002 may be based on the switches that are controlled by the control signal 1005. The output current may be distributed to current mirrors of the ISRC component 1010. For example, the output current from the IDAC component 1002 may be distributed to sense channels by a first set of current mirrors 1007 (e.g., n-current mirrors) where one of the first set of current mirrors are used to distribute the output current of the IDAC component 1002 to a second set of current mirrors 1008 (e.g., p-current mirrors) where the second set of current mirrors may distribute the output current of the IDAC component 1002 in a reverse direction (relative to the n-current mirrors) to the sense channels. In some embodiments, the second set of current mirrors (e.g., the p-current mirrors) may include an additional current mirror 1003 that generates the input current for the I/U convertor component 1020.

As shown in FIG. 10, the I/U convertor component 1020 may include a series of resistors 1022 and a multiplexor (or switch) 1023. The multiplexor 1023 may receive the output current of the ISRC component 1010 (e.g., from the current mirror 1003) and may couple the received output current to the series of resistors 1022 based on a gain control signal 1021. For example, the gain control signal 1021 may determine whether to couple the input of the I/U convertor component 1020 to a first number of resistors of the series of resistors 1022 or a second number of resistors of the series of resistors 1022. The output of the I/U convertor component 1020 may be coupled to a non-inverting amplifier of the UDAC component 1030. For example, the output of the I/U convertor component 1020 may be a reference voltage signal that is received by the positive terminal of a non-inverting amplifier of the UDAC component 1030. The output of the non-inverting amplifier may be coupled to another series of resistors which is coupled to a first multiplexor and a second multiplexor that are each controlled by a UDAC control signal.

As such, the output voltage of the UDAC component 1030 may be correlated with the output current of the ISRC component 1010. Thus, when the sense channel of a capacitive sense array receives the output current of the ISRC component 1010 (e.g., for an input signal), the reference signal of the same sense channel that is received from the UDAC component 1030 may be correlated with the output current of the ISRC component 1010.

Figure 11:
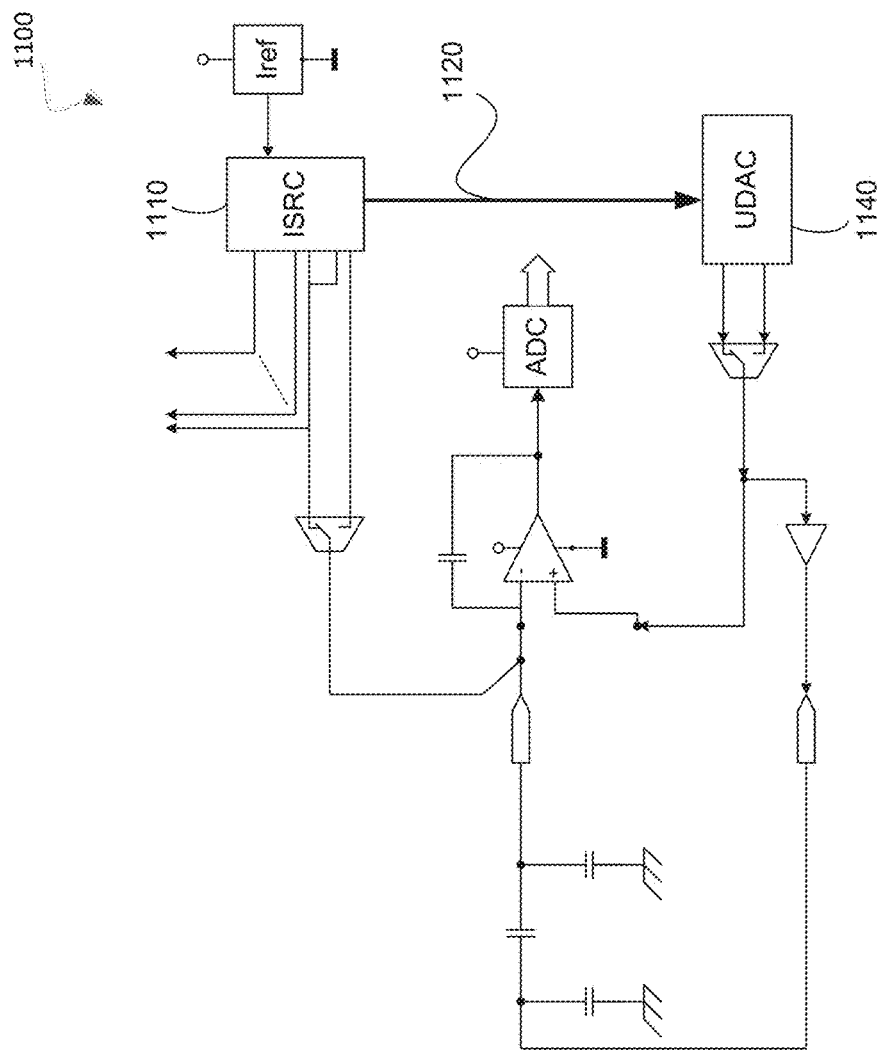
FIG. 11 is a block diagram of the capacitive touch sensing system with another signal correlation implementation in accordance with some embodiments.

FIG. 11 is a block diagram of a capacitive touch sensing system 1100. In general, the capacitive touch sensing system 1100 may correspond to the capacitive touch sensing system 900 of FIG. 9 with a modified ISRC component and a modified UDAC component.

As shown in FIG. 11, the capacitive touch sensing system 1100, a current generated by the ISRC component 1110 may be used to provide the input source to the UDAC component 1140 via the signal path 1120. As such, the capacitive touch sensing system 1100 does not include an I/U convertor component as described with regard to FIGS. 9 and 10. Further details with regard to the ISRC component 1110 and the UDAC component 1140 are described in relation to FIG. 12.

Figure 12:
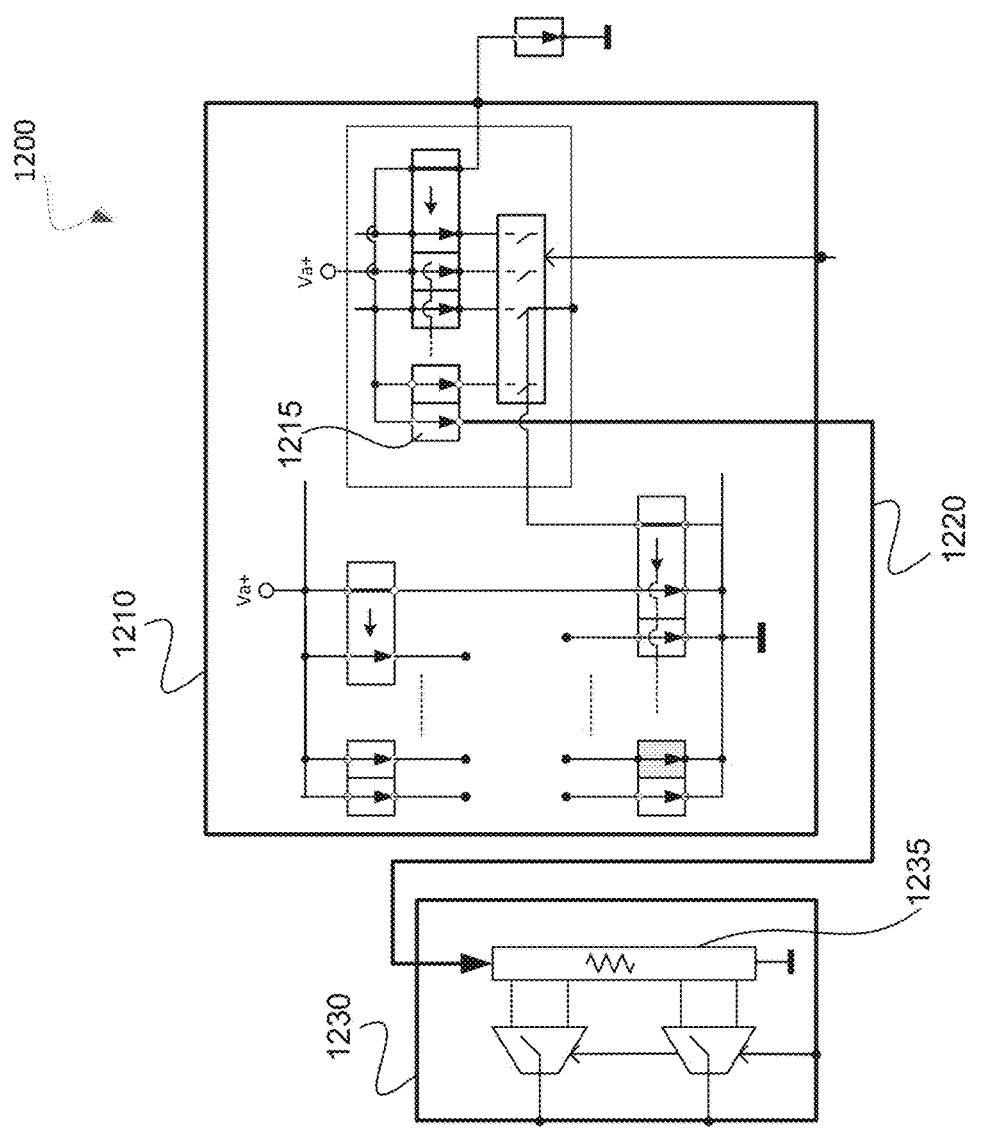
FIG. 12 is a block diagram of an architecture associated with correlating signals of the capacitive touch sensing system in accordance with some embodiments.

FIG. 12 is a block diagram of components associated with another implementation for correlation of the capacitive touch sensing system in accordance with some embodiments.

FIG. 12 is a block diagram of an architecture 1200 associated with correlating signals of a capacitive touch sensing system. In general, the architecture of the capacitive touch sensing system 1100 may include a UDAC component 1230 that may correspond to the UDAC component 1130 of FIG. 11 and an ISRC component 1210 that may correspond to the ISRC component 1110 of FIG. 11.

As shown in FIG. 12, the ISRC component 1210 may include the IDAC component with an additional current mirror 1215 that is used to generate a current based on the input reference current source. In some embodiments, the additional current mirror 1215 may repeat or copy (e.g., mirror) the current from the input reference current source. In the same or alternative embodiments, the additional current mirror 1215 may correspond to the current mirror with the greatest weight of the current mirrors of the IDAC component. The output current 1220 of the additional current mirror 1215 may be coupled to the UDAC component 1230. For example, the series of resistors of the UDAC component 1230 may directly receive the output current 1220 from the additional current mirror 1215 of the IDAC component of the IRSC component 1210.

In the description, for purposes of explanation, numerous specific details are set forth in order to provide a thorough understanding of the present disclosure. It will be evident, however, to one skilled in the art that the present disclosure may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the disclosure. The phrase "in one embodiment" located in various places in this description does not necessarily refer to the same embodiment.

For simplicity of explanation, the above methods are depicted and described as a series of acts. Although the operations of the methods herein are shown and described in a particular order, such order does not mean that such operations are necessarily performed in that order. Operations in accordance with this disclosure can occur in various orders and/or concurrently, and with other acts not presented and described herein. Certain operations may be performed, at least in part, concurrently with other operations and certain operations may be performed in an inverse order to that shown or described.

The methods described above regarding capacitance to code conversion can be implemented by the baseliner component 120, which may be implemented in a capacitive touch screen controller. In one embodiment, the capacitive touch screen controller is the TrueTouch® capacitive touchscreen controller, such as the CY8CTMA3xx family of TrueTouch® Multi-Touch All-Points touchscreen controllers, developed by Cypress Semiconductor Corporation of San Jose, Calif. The TrueTouch® capacitive touchscreen controllers sensing technology to resolve touch locations of multiple fingers and a stylus on the touch-screens, supports operating systems, and is optimized for low-power multi-touch gesture and all-point touchscreen functionality. Alternatively, the touch position calculation features may be implemented in other touchscreen controllers, or other touch controllers of touch-sensing devices. In one embodiment, the touch position calculation features may be implemented with other touch filtering algorithms as would be appreciated by one of ordinary skill in the art having the benefit of this disclosure.

The embodiments described herein may be used in various designs of mutual-capacitance sensing arrays of the capacitance sensing system, or in self-capacitance sensing arrays. In one embodiment, the capacitance sensing system detects multiple sense elements that are activated in the array, and can analyze a signal pattern on the neighboring sense elements to separate noise from actual signal. The embodiments described herein are not tied to a particular capacitive sensing solution and can be used as well with other sensing solutions, including optical sensing solutions, as would be appreciated by one of ordinary skill in the art having the benefit of this disclosure.

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "integrating," "comparing," "balancing," "measuring," "performing," "accumulating," "controlling," "converting," "accumulating," "sampling," "storing," "coupling," "varying," "buffering," "applying," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments described herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely exemplary. Particular implementations may vary from these exemplary details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A capacitive touch-sensing device comprising:
    a plurality of sense channels associated with a plurality of unit cells of a capacitive sense array; and
    a baseliner component coupled to the plurality of sense channels, wherein the baseliner component includes: a sensor model coupled to an output of a buffer and a current conveyor coupled to an output of the sensor model;
    wherein the baseliner component is configured to:
        receive a transmit input (TX) signal by the buffer and a reference voltage input signal by the current conveyor to generate one or more baseline compensation signals using the sensor model; and
        provide the one or more baseline compensation signals to inputs of the plurality of sense channels;
    wherein the sensor model is separate and different from the capacitive sense array, and wherein the sensor model is used to approximate a current that is generated in response to the TX signal received by the buffer.

2. The device of claim 1, wherein the current conveyor comprises:
    a plurality of current mirrors coupled to receive a current based on the output of the sensor model and to provide mirrored output currents to the plurality of sense channels, wherein the one or more baseline compensation signals correspond to the mirrored output currents.

3. The device of claim 2, wherein the current conveyor further comprises:
    a gain component coupled to the plurality of current mirrors to apply a gain factor to the mirrored output currents.

4. The device of claim 2, wherein the current conveyor further comprises:
    a differential amplifier to receive the output of the sensor model and the reference voltage input signal and to generate the current received by the plurality of current mirrors based on the output of the sensor model and the reference voltage input signal.

5. The device of claim 1, wherein each of the plurality of sense channels is a receive (RX) channel coupled to an RX electrode of a respective unit cell of the plurality of unit cells, wherein the RX channel comprises a first input coupled to the RX electrode and an output of the baseliner component, and wherein a second input of the RX channel is coupled to a voltage source.

6. The device of claim 1, wherein the sensor model comprises:
    a first capacitor corresponding to an operation of the device in a first mode; and
    a second capacitor corresponding to the operation of the device in a second mode, wherein an input of the sensor model corresponds to the TX signal.

7. A method comprising:
    receiving a transmit (TX) signal by a buffer in a baseliner circuit associated with a capacitive sense array;
    receiving a reference voltage signal by a current conveyor in the baseliner circuit;
    generating, by the baseliner circuit, a baseline compensation signal based on the TX signal and the reference voltage signal by using a sensor model of the baseliner circuit, wherein the sensor model is coupled to an output of the buffer and the current conveyor is coupled to an output of the sensor model;
    wherein the sensor model is separate and different from the capacitive sense array, and wherein the sensor model is used to approximate a current that is generated in response to the TX signal; and
    providing the baseline compensation signal to an input of a sense channel associated with the capacitive sense array.

8. The method of claim 7, wherein generating the baseline compensation signal comprises:
   receiving an output of the current conveyor; and
   copying the output of the current conveyor to generate a mirrored output current, wherein the baseline compensation signal corresponds to the mirrored output current.

9. The method of claim 8, wherein generating the baseline compensation signal comprises:
   applying a gain factor to the mirrored output current.

10. The method of claim 7, wherein the sense channel is a receive (RX) channel coupled to an RX electrode of a unit cell of the capacitive sense array, the method further comprising:
    receiving, by the RX channel, a first input corresponding to a combination of the baseline compensation signal and an input signal from the unit cell of the capacitive sense array; and
    receiving, by the RX channel, a second input corresponding to a reference signal from a voltage source.

11. The method of claim 7, wherein generating the baseline compensation signal comprises:
    generating an output current based on a first capacitor corresponding to an operation of the capacitive sense array in a first mode or a second capacitor corresponding to the operation of the sensor model in a second mode, wherein the baseline compensation signal is based on the output current.

12. A capacitive touch-sensing system comprising:
    a plurality of unit cells, each unit cell comprising an electrode or a pair of electrodes;
    a plurality of sense channels coupled to the plurality of unit cells; and
    a baseliner component coupled to the plurality of sense channels, wherein the baseliner component includes: a sensor model coupled to an output of a buffer and a current conveyor coupled to an output of the sensor model;
    wherein the baseliner component is configured to:
      receive a transmit (TX) signal by the buffer and a reference voltage signal by the current conveyor to generate one or more baseline compensation signals using the sensor model; and
      provide the one or more baseline compensation signals to inputs of the plurality of sense channels;
    wherein the sensor model is separate and different from the plurality of unit cells, and wherein the sensor model is used to approximate a current that is generated in response to the TX signal received by the buffer.

13. The capacitive touch-sensing system of claim 12, wherein the current conveyor comprises:
    a plurality of current mirrors coupled to receive a current based on the output of the sensor model and to provide mirrored current outputs to the plurality of sense channels, wherein the one or more baseline compensation signals correspond to the mirrored current outputs.

14. The capacitive touch-sensing system of claim 13, wherein the current conveyor further comprises:
    a gain component coupled to the plurality of current mirrors.

15. The capacitive touch-sensing system of claim 13, wherein the current conveyor further comprises:
    a differential amplifier to receive the output of the sensor model and the reference voltage signal and to generate the current received by the plurality of current mirrors based on the output of the sensor model and the reference voltage signal.

16. The capacitive touch-sensing system of claim 12, wherein each of the plurality of sense channels is a receive (RX) channel coupled to an RX electrode of a respective unit cell of the plurality of unit cells, wherein the RX channel comprises a first input coupled to the RX electrode and an output of the baseliner component, and wherein a second input of the RX channel is coupled to a voltage source.

* * * * *